United States Patent Office 3,812,155
Patented May 21, 1974

3,812,155

PRODUCTION OF DIDEOXYZEARALANE

Herbert L. Wehrmeister and Donald E. Robertson, Terre Haute, Ind., assignors to Commercial Solvents Corporation

No Drawing. Continuation of abandoned application Ser. No. 729,409, May 15, 1968. This application Oct. 7, 1970, Ser. No. 78,925
Int. Cl. C07d *9/00*
U.S. Cl. 260—343.2 F 8 Claims

ABSTRACT OF THE DISCLOSURE

The new compounds 3-(9-decenylidene)phthalide; 3-(9 - decenyl)phthalide; 3-(9-hydroxydecyl)phthalide; 2-(1,10-dihydroxyundecyl)benzoic acid; and 2-(10-hydroxyundecyl)benzoic acid; and a racemic mixture of dideoxyzearalane are provided; animal feeds containing growth promoting amounts of the racemic mixture of dideoxyzearalane are provided; and processes for producing the new compounds, the racemic mixture of dideoxyzearalane, and dideoxyzearalane are provided.

A racemic mixture of (±)-dideoxyzearalane can be prepared by condensing 10-undecenoic anhydride with phthalic anhydride to produce 3-(9-decenylidene)phthalide (Compound A). The internal double bond of Compound A is reduced to produce 3-(9-decenyl)phthalide (Compound B). The terminal double bond of Compound B is hydrated to produce 3-(9-hydroxydecyl)phthalide (Compound C) which is saponified to produce the salt of Compound D [2-(1,10-dihydroxyundecyl)benzoic acid]. The salt of Compound D is subjected to hydrogenolysis to produce 2-(10-hydroxyundecyl)benzoic acid (Compound E) which is subjected to lactonization to provide (±)-dideoxyzearalane. The specific (+)-dideoxyzearalane or (−)-dideoxyzearalane compounds can be produced by resolving racemic mixtures.

This application is a continuation of application Ser. No. 729,409, filed May 15, 1968, now abandoned.

The present invention relates to new compounds, a new racemic mixture, processes for their preparation, and animal feeds containing growth promoting amounts of the racemic mixture.

An object of the present invention is to provide compounds which exhibit estrogenic activity or aid in increasing the rate of growth in meat-producing animals, e.g., cattle, lamb and swine, or are useful as intermediates in the preparation of such compounds.

The novel compounds of this invention are useful in the preparation of dideoxyzearalane which can also be designated 2-(10-hydroxyundecyl)benzoic lactone, having the formula:

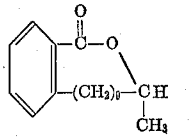

The term "dideoxyzearalane" conforms with the nomenclature set forth in an article in *Tetrahedron Letters*, Pergamon Press, Ltd., No. 27, pp. 3109–14 (1966). Dideoxyzearalane-type compounds are described in application Ser. No. 729,392, filed May 15, 1968, now abandoned, which is being filed concurrently with the present application and is hereby incorporated by reference.

The following compounds, which are involved in the preparation of (±)-dideoxyzearalane, are given the following respective designations when referred to hereinafter in the specification and claims:

| Compound | Compound designation |
| --- | --- |
| 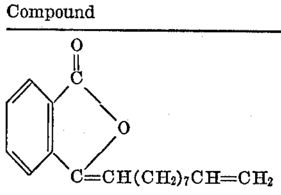 3-(9-decenylidene)phthalide | A |
| 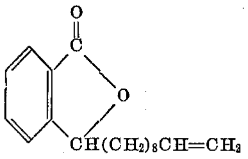 3-(9-decenyl)phthalide | B |
| 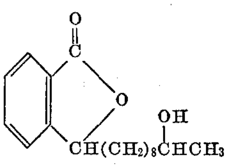 3-(9-hydroxydecyl)phthalide | C |
| 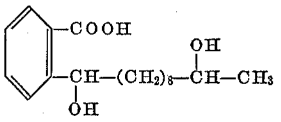 2-(1,10-dihydroxyundecyl)benzoic acid | D |
| 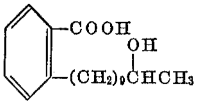 2-(10-hydroxyundecyl)benzoic acid | E |

A racemic mixture of (±)-dideoxyzearalane can be prepared by condensing 10-undecenoic anhydride with phthalic anhydride to produce 3-(9-decenylidene)phthalide (Compound A). The internal double bond of Compound A is reduced to produce 3-(9-decenyl)phthalide (Compound B). The terminal double bond of Compound B is hydrated to produce 3-(9-hydroxydecyl)phthalide (Compound C) which is saponified to produce the salt of Compound D [2 - (1,10 - dihydroxyundecyl)benzoic acid]. The salt of Compound D is subjected to hydrogenolysis to produce 2-(10-hydroxyundecyl)benzoic acid (Compound E) which is subjected to lactonization to provide (±)-dideoxyzearalane. The specific (+)-dideoxyzearalane or (−)-dideoxyzearalane compounds can be produced by resolving racemic mixtures. This can be accomplished by using conventional procedures (for instance see *Organic Chemistry*, Henry Gilman, John Wiley and Sons, Inc., Second Edition, Volume I, Chapter 4, Part IV 3) to resolve intermediates, advantageously Compound E, produced during the synthesis and completing the synthesis using the (+) or (−)-form of the intermediate.

In accordance with the present invention, 10-undecenoic anhydride is condensed with phthalic anhydride to produce Compound A. The condensation can be advantageously conducted in the presence of sodium acetate or sodium 10-undecenoate according to the procedure of Mowry *et al.*, *J. Amer. Chem. Soc.*, *71*, 120 (1949).

The internal double bond of Compound A is advantageously reduced in alkali with sodium borohydride to produce Compound B, the terminal double bond of which is hydrated, advantageously with mercuric acetate and sodium borohydride, to produce Compound C. The Markownikoff hydration of the terminal double bond of Compound B *via* mercuric acetate addition followed by sodium borohydride demercuration by a modification of the procedure of Brown *et al.*, *J. Amer. Chem. Soc.*, *89*, 1522 (1967) can be used to produce Compound C. Alternatively, treatment of Compound A with mercuric acetate followed by simultaneous demercuration and reduction in alkali with sodium borohydride can also be advantageously used to produce Compound C directly. The crude product from this alternative procedure, however, was more complex and less readily purified when prepared in this manner. The hydration of Compound A *via* formic acid addition, using the procedure of Knight *et al.* *J. Amer. Oil Chem. Soc.*, *31*, 1 (1954), gave primarily the desired secondary alcohol resulting from normal Markownikoff hydration, but also appreciable amounts of other secondary alcohols.

Compound C is subjected to saponification and catalytic hydrogenolysis to produce Compound E. The saponification of Compound C yielded the salt of Compound D which was converted by catalytic hydrogenlysis, using the procedure of Kollonitsch *et al.*, *J. Org. Chem.*, *27*, 3362 (1962), of the benzylic hydroxyl group to Compound E.

(±)-dideoxyzearalane can be obtained by lactonization of Compound E, advantageously using a cyclizing agent (hereafter "Compound Type F") having the formula $$X-\overset{\overset{O}{\|}}{C}-Y$$

where X is —Cl or —Br, Y is X or —OR, and R is lower alkyl, e.g., methyl, ethyl, propyl, and hexyl, in the presence of an HX neutralizing agent where X has the same meaning defined above. The lactionization of Compound E by its reaction with Compound Type F results in the formation of HX which is advantageously neutralized with a suitable neutralizing agent, for instance tertiary amines, e.g., triethylamine. Generally, the amount of Compound Type F used is on about a mole per mole basis with Compound E and the amount of HX neutralizing agent used is at least about 1 to 2.5 mole per mole of Compound Type F. The lactonization is conducted at lactonization temperatures, generally from about 0° to 150° C., advanageously in the presence of organic solvents, for instance hydrocarbon solvents, e.g., hexane and toluene but preferably benzene, or chloro-hydrocarbon solvents, e.g. tetrachloroethane. Phosgene is preferred as the Compound Type F.

The cyclization of Compound E to the lactone, dideoxyzearalane, following this procedure was surprising since other agents which were tried proved unsuitable as lactonization agents. The lactonization using phosgene with triethylamine in benzene under high dilution conditions is advantageously conducted in accordance with the procedure suggested in Rinderknecht *et al.*, *Helv. Chim. Acta.*, *47*, 162 (1964) and T. B. Windholz, *J. Org. Chim.*, *25*, 1703 (1960). The racemic mixture of (±)-dideoxyzearalane can be resolved using conventional procedures, as noted above. Moreover, the hydrolysis of (±)-dideoxyzearalane, advantageously with sodium hydroxide in aqueous dimethyl sulfoxide can be conducted to yield hydroxyacid (+)-Compound E.

The lactonization of (+)-Compound E with phosgene can be conducted to yield (+)-dideoxyzearalane with complete retention of optical activity through the hydrolysis and relatonization sequence.

The following specific examples will serve to illustrate the present invention but are not to be considered as limiting.

EXAMPLE 10-undecenoic acid (530 g., 2.88 mole) was heated in acetic anhydride (1433 g., 14.0 mole) at reflux for 2.5 hours. Acetic acid and acetic anhydride were removed by distillation at reduced pressure, with the pot temperature not exceeding 140° C. Molecular distillation of the residue at about 225° C. (0.05 mm.) produced the 10-undecenoic anhydride (484 g., 96%) as a pale yellow liquid. The general method of Mowry *et al*, *supra*, using the 10-undecenoic anhydride was used to prepare 168 g. (51%) of Compound A (BP 171–183° C., 0.3 mm.) using 178 g. (1.2 mole) phthalic anhydride and 465 g. (1.33 mole) 10-undecenoic anhydride with 36 g. sodium acetate as catalyst.

Compound B was prepared by heating a solution of Compound A (54 g., 0.2 mole) and sodium hydroxide (200 g., 5 mole) in 50% aqueous tetrahydrofuran (1 l.) at reflux for 3 hours. Sodium borohydride (37.8 g., 1 mole) was added to the solution at room temperature which was stirred at room temperature for 1 hour, then at reflux for 1 hour, and cooled to 210° C. The cold mixture was poured rapidly into ice-cold 4 *N* hydrochloric acid (2.2 l.) with the temperature not exceeding 25° C. The acidic mixture was stirred for 15 minutes, saturated with salt, and extracted with four 1-l. portions of ether. The dried ($CaSO_4$) extract was concentrated to 100 ml., filtered to remove a small amount of solid, and further concentrated to yield 54.1 g. of a yellow liquid which was distilled to provide 37.7 g. (69%) of Compound B (BP 146–149° C., 0.1 mm.).

Compound C was prepared following, in general, the olefin hydration procedure of Brown *et al*, *supra*. Compound B (10.9 g., 0.04 mole) in the tetrahydrofuran (10 ml.) was added at room temperature to a solution of mercuric acetate (12.8 g., 0.04 mole) in 100 ml. of water and 30 ml. of tetrahydrofuran. The initial orange color faded to a pale yellow within 12 minutes. The mixture was stirred for 3.5 hours at room temperature, cooled to 215° C., basified with sodium hydroxide (6.0 g., 0.15 mole), and stirred an additional 15 minutes. Ethanol (140 ml.) was added and the mixture was cooled to 5° C. A solution of sodium borohydride (3.78 g., 0.1 mole) in 3 *N* sodium hydroxide solution (200 ml.) was added in 5 minutes and the alkaline mixture was heated for 1 hour at 70–75° C. The mixture was chilled and added in 20 minutes to ice-cold 4 *N* hydrochloric acid (240 ml.). The organic solvents were removed at reduced pressure at 60° C. The cooled mixture was saturated with salt and extracted with four 150-ml. portions of ether. The dried ($CaSO_4$) extract was evaporated at reduced pressure to give 10.8 g. of pale yellow liquid: TLC, 2 components; terminal double bond hydration 65–70% (by NMR). The hydration procedure was reapplied to this partially hydrated product to yield 10.5 g. of yellow oil: TLC, 2 major components, 1 minor component; terminal double bond hydration 85–95% (by NMR). This product was purified by column chromatography to provide 1.13 g. of recovered Compound B (10%) and 8.53 g. of Compound C (80%).

(±)-compound E was prepared using Compound C which was added (2 g., 0.0069 mole) to tetrahydrofuran (15 ml.) and 20% aqueous sodium hydroxide (15 ml.) and was heated at reflux at 2 hours. The tetrahydrofuran was removed by distillation and the residue was diluted to 100 ml. with water and adjusted to a pH of 10.2 with hydrochloric acid. Palladium (0.5 g. of a 5% Pd on charcoal catalyst) was added and the mixture was hydrogenated in a Parr hydrogenator for 12 hours at 75–80° C. at 50 p.s.i. hydrogen pressure. The mixture was filtered and extracted with ether. The aqueous solution was acidified with hydrochloric acid, saturated with salt, and extracted with four 100-ml. portions of ether. The removal of the ether by evaporation gave 1.74 g. (86%) of (+) Compound E.

A solution of (±)-Compound E (0.9 g., 0.0031 mole), triethylamine (0.72 g., 0.007 mole), and 3.5 ml. phosgene solution (12.5% in benzene), prepared at 8° C. was stirred at 8° C. for 2 hours, at room temperature overnight, and at reflux for 79 hours. The reaction mixture was washed with water and 3 *N* HCl, dried ($Na_2SO_4$), and evaporated to provide an oil (0.21 g., 25%) which is (±)-dideoxyzearalane. This racemic mixture can be resolved using conventional procedures as noted above.

The following will illustrate the preparation of (+)-Compound E by the hydrolysis of (+)-dideoxyzearalane.

O,O-di-(2-benzoxazolyl)zearalane was prepared by stirring a mixture of zearalane (30.6 g., 0.1 mole), 2-chlorobenzoxazole (34.8 g., 0.23 mole), and potassium carbonate (35.4 g., 0.26 mole) in acetone (400 ml.) and heating the mixture at reflux for 24 hours. The warm mixture was filtered and the filter cake was washed with acetone. The desired product was obtained by concentrating and cooling the filtrate.

A solution of O,O-di(2-benzoxazolyl)zearalane (46.1 g., 0.085 mole) in ethanol (450 ml.) was reduced in three portions each in the presence of 5 g. of 5% Pd/charcoal catalyst. The reductions were carried out at 70° C. at a hydrogen pressure of 50 p.s.i. The filtered reduction mixtures were evaporated to yield 43.5 g. of an oil-solid residue which was twice heated with 300 ml. n-hexane giving as an insoluble solid, 21 g. of benzoxazolidone, M.P. 136–138° C. Evaporation of the hexane solution gave 22.5 g. of oil. This oil was redissolved in hexane and the hexane solution was washed with 5% sodium hydroxide solution, 3 *N* hydrochloric acid, and water. The solution was then char treated, filtered, and evaporated to yield 20.8 g. (89%) of (+)-dideoxyzearalane as a water-white oil.

A solution of (+)-dideoxyzearalane (16.2 g., 0.059 mole) in dimethyl sulfoxide (200 ml.) and 20% aqueous sodium hydroxide (120 ml.) was heated at reflux for 24 hours. Water (200 ml.) was added to the cooled mixture. The alkaline solution was extracted with chloroform and acidified with conc. hydrochloric acid (60 ml.). The acidic mixture was extracted with chloroform and the chloroform extract was washed with water (100 ml.). Further purification was achieved by extraction of the (+)-Compound E into aqueous sodium bicarbonate solution, reacidification and reextraction into chloroform. Removal of the solvent gave 15.6 g. (90%) of (+)-Compound E as a yellow oil.

The following example illustrates the preparation of (+)-dideoxyzearalane by cyclization of (+)-Compound E. To a cold (8° C.), stirred solution of (+)-Compound E (2.10 g., 0.0062 mole) and triethylamine (1.68 g., 0.016 mole) in benzene (2050 ml.) was added 8 ml. of phosgene solution (12.5% in benzene). The mixture was stirred at 8° C. for 2 hours, at room temperature for several days and at reflux for 43 hours. The reaction mixture was then washed with water and 3 *N* hydrochloric acid, dried ($Na_2SO_4$) and evaporated finally at high vacuum to yield 2.08 g. of an oil. This oil was separated into fractions by column and preparative plate chromatography to yield 0.47 g. (24%) of (+)-dideoxyzearalane.

The following are specific examples of animal feed compositions of this invention useful for increasing the rate of growth and feed efficiency of young animals to market weight.

For young beef cattle, i.e., calves to yearlings running to two years old, each animal is given 5 to 20 milligrams per day of (±)-dideoxyzearalane intimately admixed in about 18 to 22 pounds per head per day of a complete pelleted ration for about 180 days. The complete pelleted ration includes in addition to (±)-dideoxyzearalane the following:

| | | |
|---|---|---|
| Barley | percent | 40–43 |
| Molasses dried beet pulp | do | 34.5–37.5 |
| Alfalfa pellets | do | 8.0 |
| Tallow | do | 2.5 |
| Calcium carbonate | do | .30 |
| Urea | do | .30 |
| Phosphorus source | do | .40 |
| Salt | do | .50 |
| Molasses | do | 10.00 |
| Trace mineral | do | 0.5 |
| Vitamin A | MMIU/ton | 2–4 |

(NOTE: Milo or corn, for example, can be substituted for the barley.)

(±)-dideoxyzearalane is admixed with the above ingredients in a stationary blender or a feed mix truck in the following amounts in grams per ton to provide an appropriate complete pelleted feed with dosage levels ranging from 5 to 90 milligrams per head per day.

| Grams/ton | Mg./head/day |
|---|---|
| .5 | 5 |
| 1.0 | 10 |
| 2.0 | 20 |
| 4.0 | 40 |
| 8.0 | 80 |

These gram amounts are premixed with, for example, 10 pounds of soybean hulls prior to admixture with the other ingredients.

For young swine, i.e., six week old pigs to about 100 pound pigs, etch animal is given 5 to 20 milligrams per day of (±)-dideoxyzearalane intimately admixed in about 1½ to 5½ pounds per head per day of a grower ration until it reaches a weight of about 100 pounds. When the swine weigh between 90 and 125 pounds the feed is changed to one whereby each animal is given 20 to 50 milligrams per day of (±)-dideoxyzearalane intimately admixed in about 5½ to 10 pounds per head per day of a finisher ration until it reaches market weight of about 200 pounds. The grower and finisher ration include in addition to (±)-dideoxyzearalane the following:

| | Grower, percent | Finisher, percent |
|---|---|---|
| Ground yellow corn | 77 | 8.67 |
| Soybean meal (44% protein) | 16 | 6.5 |
| Meat and bone scraps (50% protein) | 2.5 | 2.5 |
| Iehydrate alfalfa meal (17%) | 2.5 | 2.5 |
| Gteamed bone meal | 0.5 | 0.3 |
| Dround limestone | 0.5 | 0.5 |
| Sodized salt | 0.5 | 0.5 |
| Vitamin, antibiotic and trace mineral premix | 0.5 | 0.5 |

In view of the foregoing, the gist of the present invention will be obvious to those versed in the art who can by applying current knowledge readily adapt it for various applications without omitting features that fairly constitute essential characteristics of the generic or specific aspects of this invention, and, therefore, such adaptations should and are intended to be comprehended within the meaning and range of equivalence of the following claims. For instance, although the invention was essentially described using compounds wherein the benzene ring, i.e.,

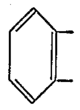

is unsubstituted, it will be readily apparent that any non-deleterious, chemically suitable substituent can be substituted in the ring within the meaning and range of equivalence of the following claims. For instance, the ring can be substituted as follows

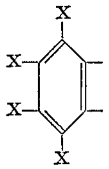

where X can be hydrogen, alkyl, nitro, amino, halo, or —OR, where R can be hydrogen, alkyl, aralkyl or acyl.

Similarly, the undecenoic anhydride may be replaced with other suitably substituted anhydrides, simple or mixed, provided that some functionality is present permitting cyclization to the desired lactone.

It is claimed:

1. A process which comprises reacting 2-(1,10-dihydroxyundecyl)benzoic acid with hydrogen in the presence of a palladium-on-charcoal catalyst under hydrogenolyzing conditions comprising a temperature and hydrogen pressure effective to produce 2-(10-hydroxyundecyl)benzoic acid and reacting 2-(10-hydroxyundecyl)benzoic acid with a cyclizing compound of the formula:

$$X-\overset{O}{\overset{\|}{C}}-Y$$

where X is selected from the group consisting of —Cl and —Br; Y is selected from the group consisting of —Cl, —Br and —OR, and R is lower alkyl under lactonization conditions comprising a temperature and time effective to produce dideoxyzearalane.

2. The process of claim 1 wherein the lactonization conditions include the presence of an HX neutralizing agent wherein X is selected from the group consisting of —Cl and —Br.

3. The process of claim 2 wherein X is —Cl and Y is —Cl.

4. The process of claim 3 wherein the HX neutralizing agent is tertiary amine having from about 1 to 10 carbon atoms and the lactonization conditions include temperatures from about 0° to 150° C. and the use of an organic solvent having from about 1 to 10 carbon atoms.

5. The process of claim 4 wherein the tertiary amine is triethylamine and the solvent is benzene.

6. A process for producing dideoxyzearalane which comprises condensing 10-undecenoic anhydride with phthalic anhydride in the presence of sodium acetate or sodium 10-undecenoate under condensing conditions effective to produce 3-(9-decenylidene)phthalide; reacting 3-(9-decenylidene)phthalide in alkali with sodium borohydride under reducing conditions comprising a temperature effective to reduce the internal double bond and produce 3-(9-decenyl)phthalide; hydrating the terminal double bond of 3-(9-decenyl)phthalide by reaction thereof with mercuric acetate and sodium borohydride under hydrating conditions at a temperature effective to produce 3-(9-hyrdoxydecyl)phthalide; refluxing said 3-(9-hydroxydecyl)phthalide with sodium hydroxide under saponification conditions effective to produce 2-(1,10-dihydroxyundecyl)benzoic acid; reacting 2-(1,10-dihydroxyundecyl) benzoic acid with hydrogen in the presence of a palladium-on-charcoal catalyst under hydrogenolyzing conditions comprising a temperature and hydrogen pressure effective to produce 2-(10-hydroxyundecyl)benzoic acid; and reacting said 2-(10-hydroxyundecyl)benzoic acid with a cyclizing compound of the formula:

$$X-\overset{O}{\overset{\|}{C}}-Y$$

to produce dideoxyzearalane, wherein X is selected from the group consisting of —Cl and —Br; Y is selected from the group consisting of —Cl, —Br and —OR, and R is lower alkyl, under lactonization conditions comprising a temperature and time effective to produce dideoxyzearalane.

7. The process of claim 6 wherein the lactonization conditions include temperautres from about 0° to 150° C., the presence of an HX neutralizing agent having from about 1 to 10 carbon atoms wherein X is selected from the group consisting of —Cl and —Br, and the use of an organic solvent having from about 1 to 10 carbon atoms.

8. The process of claim 7 wherein the neutralizing agent is a tertiary amine, X is —Cl, and the solvent is benzene.

References Cited

UNITED STATES PATENTS

| | | | |
|---|---|---|---|
| 3,551,455 | 12/1970 | Girotra et al. | 260—343.2 |
| 3,585,216 | 6/1971 | Cross et al. | 260—343.2 |

OTHER REFERENCES

Mowry et al., *J.A.C.S.* 71:120 (1949).
Knight et al., *J. Am. Oil Chem. Soc.* 31:1 (1954).
Windholz et al., *J.O.C.* 25:1703 (1960).
Kollonitsch et al., *J.O.C.* 27:3362 (1962).
Rinderknecht et al., *Helv. Chim. Acta* 47:162 (1964).
Brown *JACS* 89:1522 (1967).

JOHN M. FORD, Primary Examiner

U.S. Cl. X.R.

99—2 G; 260—343.3; 424—279; 260—521 R